62-162

Search Room

May 26, 1936. W. F. SWEZEY Re. 19,988

REFRIGERATING APPARATUS Orig. 1,825,291

Original Filed April 11, 1929 2 Sheets-Sheet 1

WITNESSES:
James R. Mosser
W. M. Van Sciver

INVENTOR
WILLIAM F. SWEZEY
BY A. B. Rivis
ATTORNEY

May 26, 1936. W. F. SWEZEY Re. 19,988

REFRIGERATING APPARATUS

Original Filed April 11, 1929 2 Sheets-Sheet 2

INVENTOR
William F. Swezey.
BY
A. B. Rennie
ATTORNEY

62. REFRIGERATION.
4
Search Room

Reissued May 26, 1936

Re. 19,988

UNITED STATES PATENT OFFICE 19,988

REFRIGERATING APPARATUS

William F. Swezey, Cleveland, Ohio, assignor to Westinghouse Electric & Manufacturing Company, a corporation of Pennsylvania Original No. 1,825,291, dated September 29, 1931, Serial No. 354,239, April 11, 1929. Application for reissue March 29, 1933, Serial No. 663,410

14 Claims. (Cl. 62—4)

This invention relates to refrigerating apparatus and more particularly to the automatic controls for such apparatus.

It is an object of the invention to provide a refrigerating apparatus adapted to automatically operate within predetermined temperature limits, and, in addition, to provide means for temporarily moving the normal range of temperatures produced in the evaporator, in order that a temperature higher than is normally required may be produced at predetermined times.

More specifically, the invention has for its object to provide a thermostatically controlled refrigerating apparatus in which the operation of the thermostat to start the motor may be rendered ineffective by a manually-set means in order that the evaporator temperature may rise sufficiently to permit defrosting of the unit, and, when this result has been accomplished, to permit the machine to thereafter function within its normal range of temperatures.

Other objects and advantages of this invention will be apparent from the following description and accompanying drawings, wherein Figure 1 is a diagrammatic view of a refrigerating apparatus embodying the invention.

Figure 1:
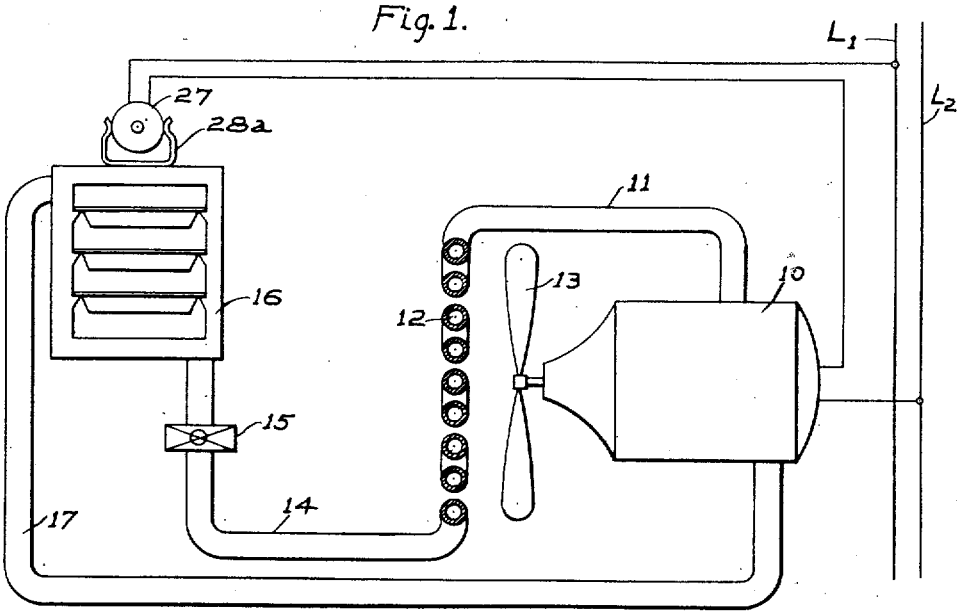
Figure 2:
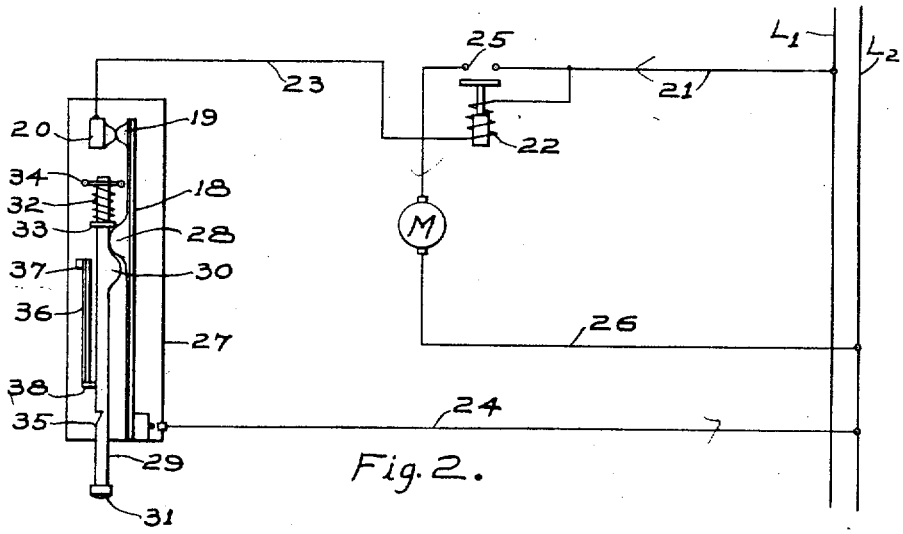
Fig. 2 is a wiring diagram of the circuit for controlling the apparatus shown in Fig. 1.

Referring to Figs. 1 and 2, 10 designates the motor-compressor unit from which the compressed refrigerant flows through a conduit 11 to the condenser 12. The condenser is cooled by a fan 13. The condensed refrigerant passes from the condenser, by means of a conduit 14, to a pressure-reducing valve 15, and then into the evaporator 16 where the liquid refrigerant expands and absorbs heat in a well-known manner. The expanded gaseous refrigerant is withdrawn from the evaporator 16 through the conduit 17 by the motor compressor unit 10.

The starting and stopping of the motor-compressor unit 10 is controlled by means of the thermostat 18 (Fig. 2). The thermostat 18 is here shown as a bi-metal member carrying, on its movable end, the contact member 19 which cooperates with a fixed contact member 20 for opening and closing the circuit to the motor from the line conductors L1 and L2.

When the members 19 and 20 are in contact, the circuit is closed from the line conductor L1, through conductor 21, relay 22, conductor 23, contact members 20 and 19, thermostat 18 and conductor 24, the line conductor L2. The relay 22 is then energized and the motor M is started, current passing from line conductor L1, through conductor 21, contact members 25, the motor M and conductor 26, to line conductor L2.

When the compressor is operated for a time sufficient to produce a predetermined low temperature in the evaporator 16, the thermostat 18 is influenced to separate contact members 19 and 20, thereby deenergizing relay 22 and stopping the motor. The thermostat 18 is enclosed in a casing 27 which is preferably mounted on the evaporator, as shown in Fig. 1, the casing 27 being held by a spring clip 28a.

Evaporators in small refrigerating apparatus usually operate at temperatures below 32° F., so that, in their normal operation, they accumulate considerable quantities of frost upon their surfaces. When frost has accumulated to a considerable thickness, it acts as an insulator and prevents the evaporator from cooling the refrigerator cabinet to its maximum capacity. Heretofore, it has been necessary to break the main circuit to the motor in order to defrost the evaporator, and then, when the frost has been melted, to manually restart the compressor-driving motor. Under this practice, it has been necessary for the owner or operator of the machine to continually watch the process of defrosting in order that the machine may be started immediately after the frost disappears. If this is not done, the box temperature rapidly rises and may cause considerable loss by food spoilage.

This invention provides a means for so controlling the defrosting of the evaporator that the operator may stop the motor at any time he desires, and, when a predetermined evaporator temperature has been reached, which should be a few degrees above 32° F., means are provided whereby the motor controlling thermostat will be rendered effective to perform its normal function.

One means of accomplishing the desired result is shown in Fig. 2. The thermostatic member 18 is provided, on one side thereof, with a rounded projection 28. This projection should be made, preferably, of hard rubber or some other insulating material. A rod 29 is provided with a similar projection 30 and is located adjacent to thermostat 18, within the casing 27. The rod 29 has an end projecting from the casing and provided with a pushbutton 31. The rod 29 is biased to its outer position by means of a spring 32 which bears against a collar 33 on the rod and cooperates with a fixed stop 34 provided within the casing 27. The rod 29 has a notched portion 35 disposed on the side opposite the projection.

Within the casing 27 is placed a second thermostat member 36 which is rigidly fixed, at one end 37, to the casing and carries, at its opposite end or movable end, a projection 38 which cooperates with the notch 35 to hold the rod 29 against the action of the spring 32.

In the operation of this form of my invention, spring 32 normally presses the rod 29 outwardly from the casing, thereby permitting the thermostat 18 to open and close contacts 19 and 20 in the normal manner. The thermostat 18 is designed to operate between temperatures below 32° F., for example, from 20 to 28° F. The thermostat 36, on the other hand, is so designed as to move in one direction, for example, to the left in Fig. 2, at a temperature of approximately 35 to 40° F., and to move to the right at any temperature below 33° F.

It will thus be apparent that, during the normal operation of the refrigerating apparatus, the thermostat 36 will be biased to the right, as indicated in Fig. 2. When the operator desires to defrost the machine, he merely pushes the button 31 inwardly. This action moves the rod 29 against the tension of the spring 32 in such manner as to cause the projections 30 and 28 to cooperate with each other and maintain the contacts 19 and 20 separated. At the same time, the projection 38 on the thermostat 36 engages the notch 35 of the rod 29 and serves to hold this rod in position against the tension of spring 32. As a result, it will be impossible for the thermostat 18 to start the motor until the rod 29 has been biased to its outward position. When the temperature of the evaporator rises a predetermined amount above the freezing point of water, for example, 35 to 40° F., as previously indicated, the thermostat 36 moves to the left, thereby releasing the rod 29 and permitting the spring 32 to separate the projections 30 and 28. The thermostat 18 thereupon immediately closes contacts 19 and 20 to permit the machine to operate in its normal range of temperatures. The relative position of the push-button 31 with respect to the casing 27 indicates whether the motor and evaporator of the refrigerator are capable of performing the refrigerating cycle or whether the evaporator is defrosting.

Figure 3:
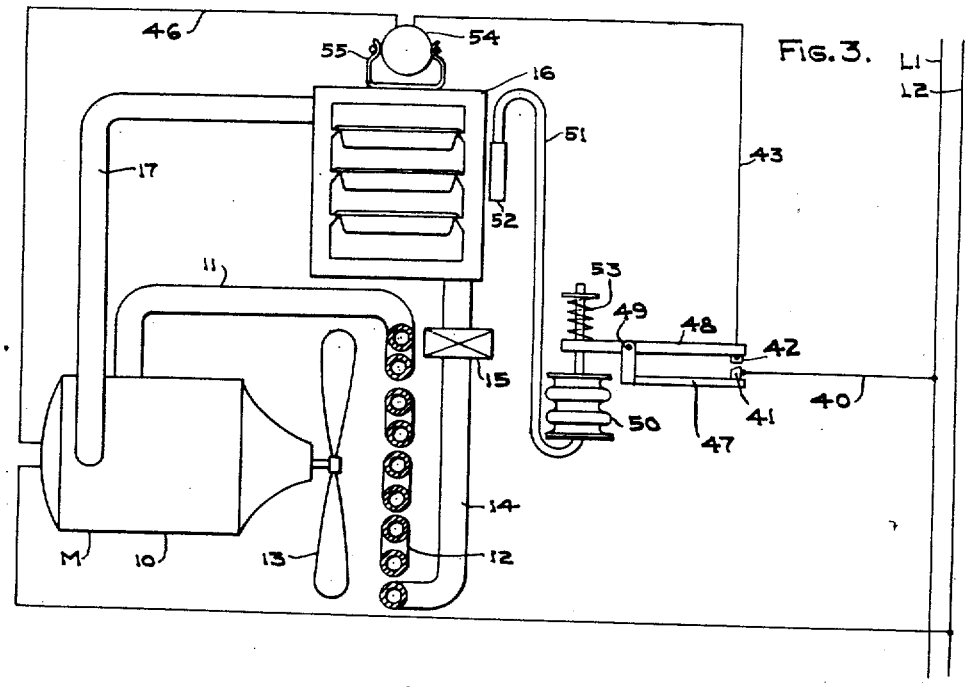
Fig. 3 is a diagrammatic view of the refrigerating apparatus operated by a pressure-controlled thermostat.
Figure 4:
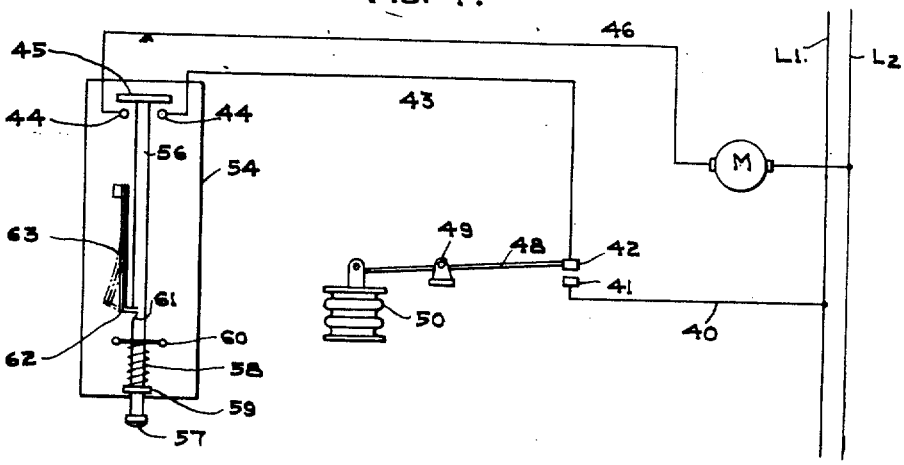
Fig. 4 is a wiring diagram of the circuits for controlling the apparatus shown in Fig. 3.

In Figs. 3 and 4, I have shown the form of the invention which is adapted to be applied to refrigerating apparatus controlled by a pressure-operated thermostat. In the normal operation of this apparatus, current passes from line conductor L1, through conductor 40, contact members 41 and 42, conductor 43, contact members 44 and 45, conductor 46 and motor M, to line conductor L2.

The opening and closing of contact members 41 and 42 is controlled by a pressure-operated switch 47, comprising a lever 48 mounted on a fixed pivot 49. This lever carries, at one end, a movable contact member 42 and is caused to operate by the expansion and contraction of pressure-responsive member 50, here shown as comprising a sylphon bellows of well-known construction. The bellows 50 is connected, by a tube 51, to a bulb 52 which is located adjacent to the evaporator 16. The bulb and tube are filled with expansible gas, so that an increase in the temperature of the evaporator causes an increase in the volume of the gas, thereby expanding the bellows 50 and closing the contact members 41 and 42. The action of the bellows 50 is regulated by means of a spring 53.

Contact members 44 and 45, previously referred to, are mounted in a casing 54 which is supported on the evaporator 16 by means of a spring clip 55. The contact members 44 and 45 are normally closed, the contact member 44 being fixed, and the contact member 45 being movable. The member 45 may be biased to open position, by means of a rod 56 which is slidably supported in the casing 54 and has one end projecting from the casing and provided with a pushbutton 57. The rod 56 is normally so biased outwardly as to maintain the contact members 44 and 45 in closed position, by means of a spring 57. This spring cooperates with a collar 59 mounted on the rod 56 and with a fixed member 60 mounted in the casing. The rod 56 is provided with a notch 61 which cooperates with a projection 62 on the movable end of a bimetallic thermostat 63 also mounted in the casing 54.

In the operation of this form of my invention, when the rod 56 is pushed inwardly against the tension of the spring 58, the projection 62 of the thermostatic member 63 engages the notch 61 and retains the rod 56 in its inmost position, thereby keeping the contact members 44 and 45 separated. When the temperature in the evaporator rises to between 35 and 40° F., thermostat 63 moves to the left as indicated in Fig. 4, thereby releasing the rod 56 and permitting the contact members 44 and 45 to close, whereupon the machine is permitted to function in its normal manner. The relative position of the push-button 57 with respect to the casing 54 indicates whether the motor and evaporator of the refrigerator are capable of performing the refrigerating cycle or whether the evaporator is defrosting.

While I have shown and described specific forms of my invention, it will be apparent that other forms might be adopted, all coming within the scope of the appended claims.

I claim as my invention:

1. Refrigerating apparatus comprising an evaporator, means for circulating a refrigerant medium through the evaporator, temperature-responsive means for controlling the starting and stopping of said refrigerant-circulating means, means mounted adjacent to the evaporator for rendering said temperature-responsive means ineffective until a predetermined higher temperature has been reached in the evaporator, and a second temperature-responsive means also mounted adjacent to the evaporator and responsive to said higher temperatures to restore the effectiveness of the first-named temperature-responsive means.

2. Refrigerating apparatus comprising an evaporator, means for circulating a refrigerant medium therethrough, a temperature-responsive device for controlling the starting and stopping of the refrigerant-circulating means, manually-operated means for rendering said device ineffective to start said circulating means, and a thermostat to render said manually-operated means ineffective whereby to permit the starting of the refrigerant-circulating means.

3. In a refrigerating apparatus an evaporator, a compressor, and a condenser, a motor for driving the compressor, a temperature-responsive device for controlling the starting and stopping of the motor, holding means for rendering the device ineffective to start the motor, and a thermostat for releasing said holding means at a predetermined temperature.

4. In an electrical refrigerator, the combination with the evaporator, means for circulating a refrigerant in the evaporator, means for maintaining the evaporator within predetermined temperature limits, and a current supply line for furnishing current to said two last named means, of a member for making and breaking the circuit in said current supply line, manually operated means for actuating said member to open the circuit in said supply line, and a thermally responsive switch device located within the refrigerator and operatively connected with said member to cause its actuation to close the circuit in said current supply line.

5. In an electrical refrigerator having an evaporator, means for circulating a refrigerant therein, means for maintaining the evaporator within predetermined temperature limits, and a current supply line for furnishing current to said two last named means, means for effecting the defrosting of the evaporator including a switch for making and breaking the circuit in said current supply line, manually controlled means for operating said switch to open position, thermally controlled means for opening said switch, said manually controlled means constituting an indicator for showing whether the evaporator is performing the refrigerating cycle or capable of defrosting.

6. In an electrical refrigerator having an evaporator, means for circulating a refrigerant therein, means for maintaining the evaporator within predetermined temperature limits, and a current supply line for furnishing current to said two last named means, means for effecting the defrosting of the evaporator including a switch means for making and breaking the circuit in said current supply line, manually controlled means for opening said switch means, thermally controlled means for closing said switch means, and mechanical indicating means associated with the switch means for indicating the position thereof and whether the evaporator is performing the refrigerating cycle or capable of defrosting.

7. A refrigerating system comprising a cooling unit, means for circulating a refrigerant medium through said unit and operable to maintain a predetermined normal cooling unit temperature, manually operable means for temporarily preventing the operation of the circulating means and a thermostatic device responsive solely to temperatures higher than those normally maintained in the cooling unit for conditioning the system to again maintain the normal cooling unit temperature.

8. A refrigerating system comprising a cooling unit, means for circulating a refrigerant medium through said unit, temperature responsive apparatus for controlling said means to maintain a predetermined temperature in said unit, and means for temporarily obtaining a higher temperature in the cooling unit by modifying the operation of said circulating means, said means including a thermostatic device responsive solely to said higher temperature for automatically restoring the system to the normal control of said temperature responsive apparatus.

9. A refrigerating system comprising a cooling unit, means for circulating a refrigerant medium through said unit, and operable to maintain a predetermined normal cooling unit temperature, and means for modifying the operation of said circulating means to temporarily obtain a higher temperature in said cooling unit, said means including an automatically operable temperature responsive mechanism for conditioning the system to maintain said predetermined normal cooling unit temperature after the attainment of a predetermined higher temperature in the cooling unit.

10. In an electric refrigerator, means for effecting the defrosting of the evaporator including a motor control switch, manually controlled means for operating said switch, thermally controlled means also for operating said switch, said manually controlled means for operating said switch constituting an indicator for showing whether the evaporator is refrigerating or defrosting.

11. In an electrical refrigerator, the combination with the evaporator, means for circulating a refrigerant in the evaporator, means for maintaining the evaporator within predetermined temperature limits, and a current supply line for furnishing current to said two last-named means, of a member for making and breaking the circuit in said current supply line, manually operated means for actuating said member to break the circuit in said current supply line, and automatic means for actuating said member to restore the circuit in said current supply line.

12. In an electrical refrigerator, the combination with an evaporator, means for circulating a refrigerant in the evaporator, means for maintaining the evaporator within predetermined temperature limits, and a current supply line for furnishing current to said two last-named means, of a member for making and breaking the circuit in said current supply line, manually operated means for actuating said member to break the circuit in said current supply line, and automatic means responsive to box temperature for actuating said member to close the circuit in said current supply line.

13. In an electrical refrigerator, the combination with the evaporator, means for circulating a refrigerant in the evaporator, means for maintaining the evaporator within predetermined temperature limits, and a current supply line for furnishing current to said two last-named means, of a member for making and breaking the circuit in said current supply line, manually operated means for actuating said member to break the circuit in said current supply line, and thermally controlled means for actuating said member to close the circuit in said current supply line.

14. In an electrical refrigerator having an evaporator and means for circulating refrigerant therein, means for maintaining the evaporator within predetermined temperature limits, and a current supply line for furnishing current to said two last-named means, of a switch for making and breaking said current in said supply line, means for automatically actuating said switch to make the circuit in the current supply line, and means for manually actuating said switch to break the circuit in the current supply line, said last-named means constituting an indicator for showing whether the evaporator is refrigerating or capable of defrosting.

WILLIAM F. SWEZEY.